United States Patent [19]

Ichikawa et al.

[11] 3,753,413
[45] Aug. 21, 1973

[54] HULL CONSTRUCTION METHOD EMPLOYING HULL CONSTRUCTION UNITS AND A FACILITY THEREFOR

[75] Inventors: Yoshio Ichikawa, Tokyo; Sadao Kenko; Katsumi Matsuhiro, both of Hiroshima, all of Japan

[73] Assignee: Ishikawajima-Harima Jukogyo Kabushiki Kaisha, Tokyo, Japan

[22] Filed: June 22, 1971

[21] Appl. No.: 155,593

[52] U.S. Cl. .................. 114/65, 114/77, 214/730
[51] Int. Cl. ........................................... B63b 3/00
[58] Field of Search ................... 114/65, 73, 77; 214/730

[56] References Cited
UNITED STATES PATENTS

| | | | |
|---|---|---|---|
| 3,572,530 | 3/1971 | Ohntrup et al. | 214/730 |
| 3,596,789 | 8/1971 | Aaronson et al. | 214/730 |

*Primary Examiner*—Milton Buchler
*Assistant Examiner*—D. C. Butler
*Attorney*—Albert C. Nolte, Jr. et al.

[57] ABSTRACT

A hull construction method comprises three work units mounting the welding and tack welding machines and other machines and equipment for facilitating the hull construction so that the hull construction works may be concentrated.

6 Claims, 7 Drawing Figures

Patented Aug. 21, 1973

INVENTORS
YOSHIO ICHIKAWA
SADAO KENKO
KATSUMI MATSUHIRO

BY *Nolte & Nolte*

ATTORNEYS

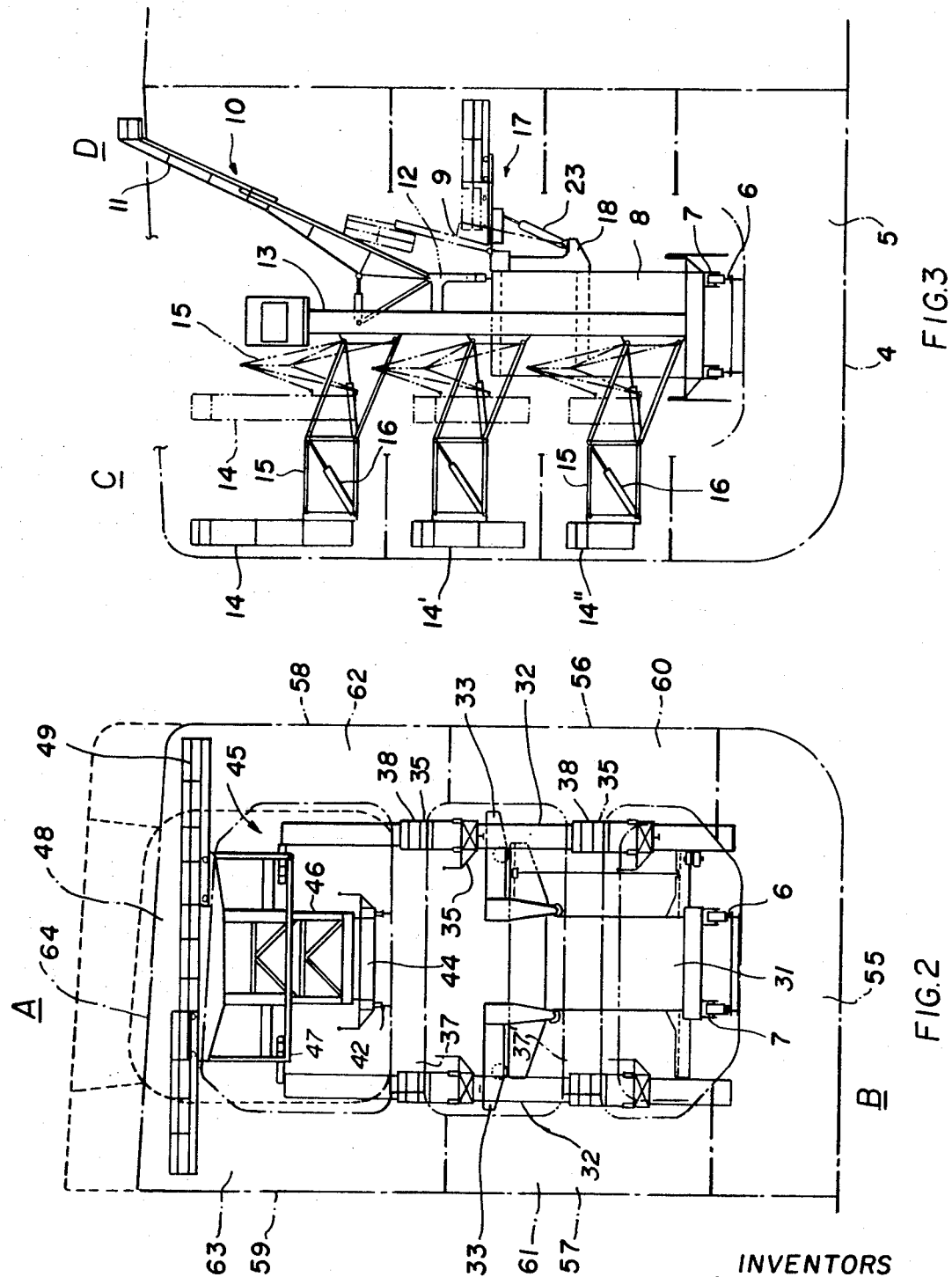

INVENTORS
YOSHIO ICHIKAWA
SADAO KENKO
KATSUMI MATSUHIRO

BY Nolte & Nolte

ATTORNEYS

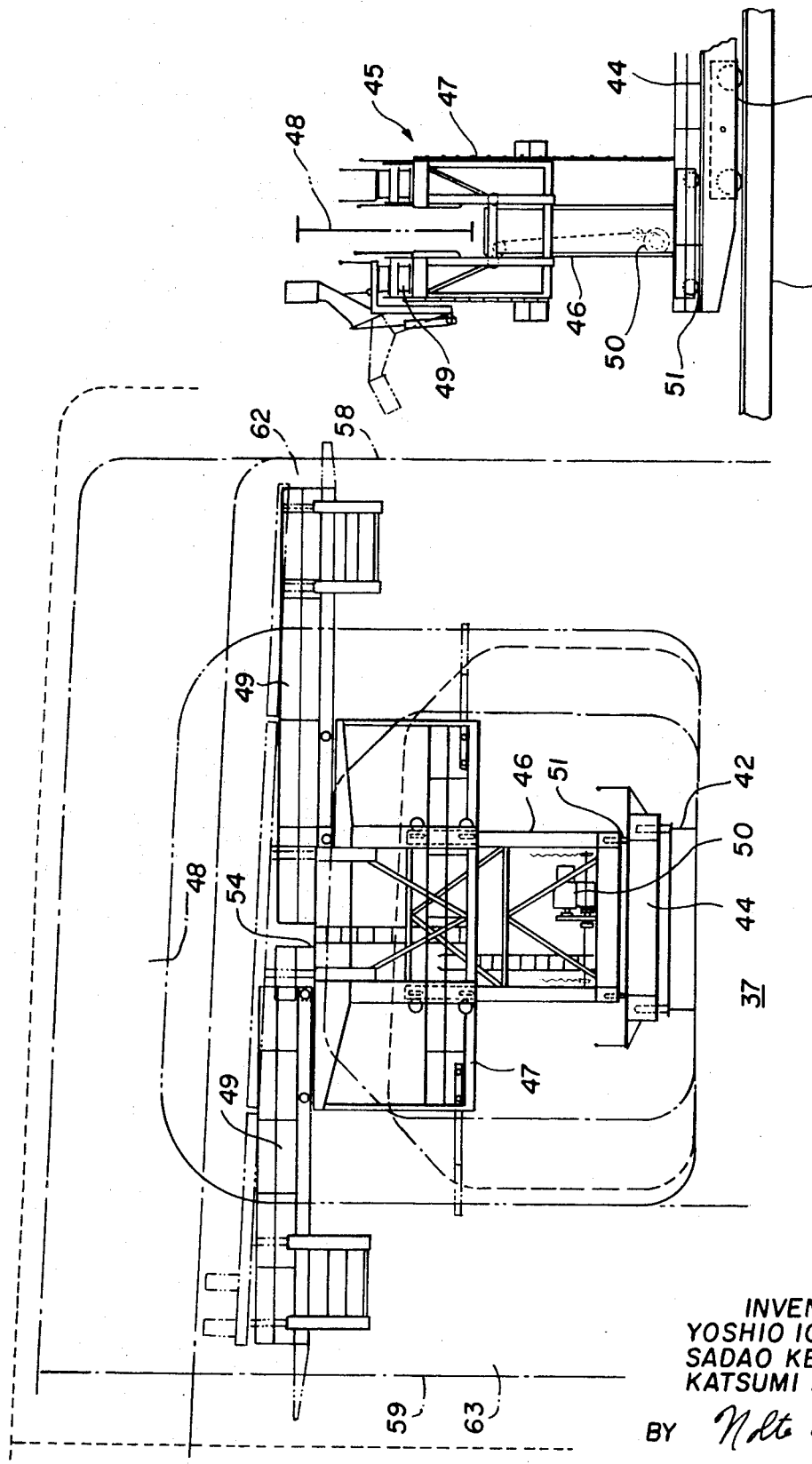

HULL CONSTRUCTION METHOD EMPLOYING HULL CONSTRUCTION UNITS AND A FACILITY THEREFOR

DETAILED EXPLANATION OF THE INVENTION

In the conventional method for constructing a hull of a large ship, a plurality of staging pieces are welded to the hull, and a plurality of working platforms are provided by supporting planks or the like by arms or brackets fixed to the staging pieces so that the workmen can erect the subassembled structures and weld them together by the welding machines and the like. When a hull in one section is completed, these stagings are removed.

However, the conventional method of the type described requires a large number of staging materials and the erection and removal of these stagings are laborious and time consuming, and the transportation of the welding machines and the like upon the platforms of the staging is dangerous.

The present invention has for its object to eliminate the problems and defects encountered in the conventional hull construction method, and provides a new and novel hull construction method and a facility therefor employing a trolly type work unit, a pole type work unit and a carriage type work unit, advancing the trolly type work unit by a distance corresponding to the length thereof after the erection and welding of side shell plates, longitudinal bulkheads and the like of the hull, erecting and welding a predetermined number of beams and struts by said pole type work unit at the working location at which said trolly type work unit accomplished its works, laying rails longitudinally upon the uppermost struts erected and welded by said pole type work unit so that said carriage type work unit may ride on said rails to move to complete the upper deck and the like, and repeating said steps to construct the hull section by section.

The present invention will become more apparent from the following description of the preferred embodiment thereof taken in conjunction with the accompanying drawings.

FIG. 2 is a sectional view thereof, the upper half of FIG. 2 being a view looking in the direction of the arrow A in FIG. 1 and the lower half of FIG. 2 being a view looking in the direction of the arrow B in FIG. 1;

FIG. 3 is a sectional view thereof, the left half being the view looking in the direction of the arrow C in FIG. 1 while the right half a view looking in the direction of the arrow D in FIG. 1;

FIG. 6 is a sectional view of a carriage type work unit; and

FIG. 7 is a longitudinal side view thereof illustrating a staging of the carriage type work unit.

The hull construction facility of the present invention includes a tower work unit 1, which is driven by trollies, a mono-pole tower work unit 2 for erection of the upper and lower hull structures and a carriage work unit 3. All of the work units 1, 2 and 3 are moved in the longitudinal direction of a ship being built.

Figure 1:
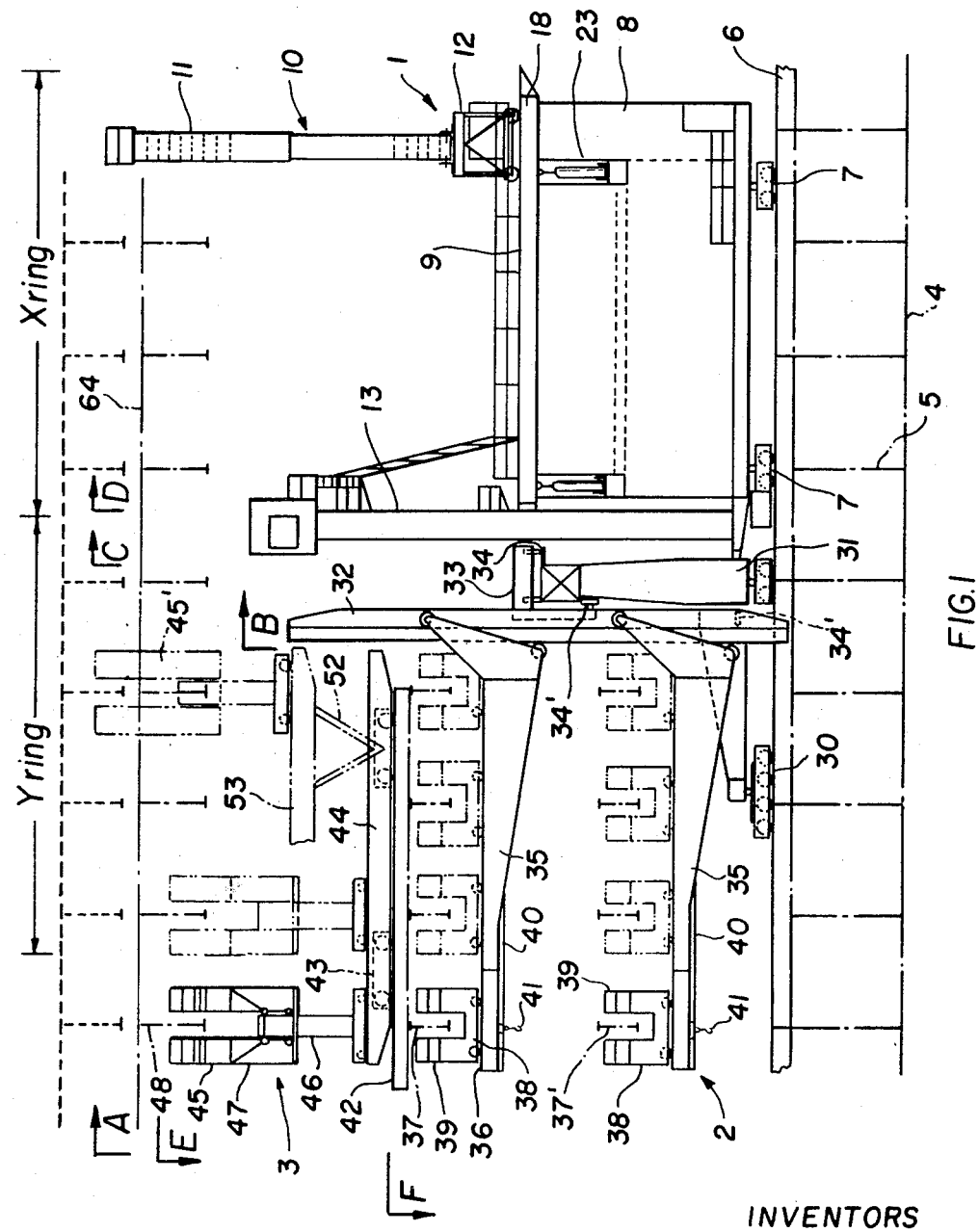
FIG. 1 is a side view of a hull construction facility of the present invention illustrating the hull construction process by three work units.
Figure 4:
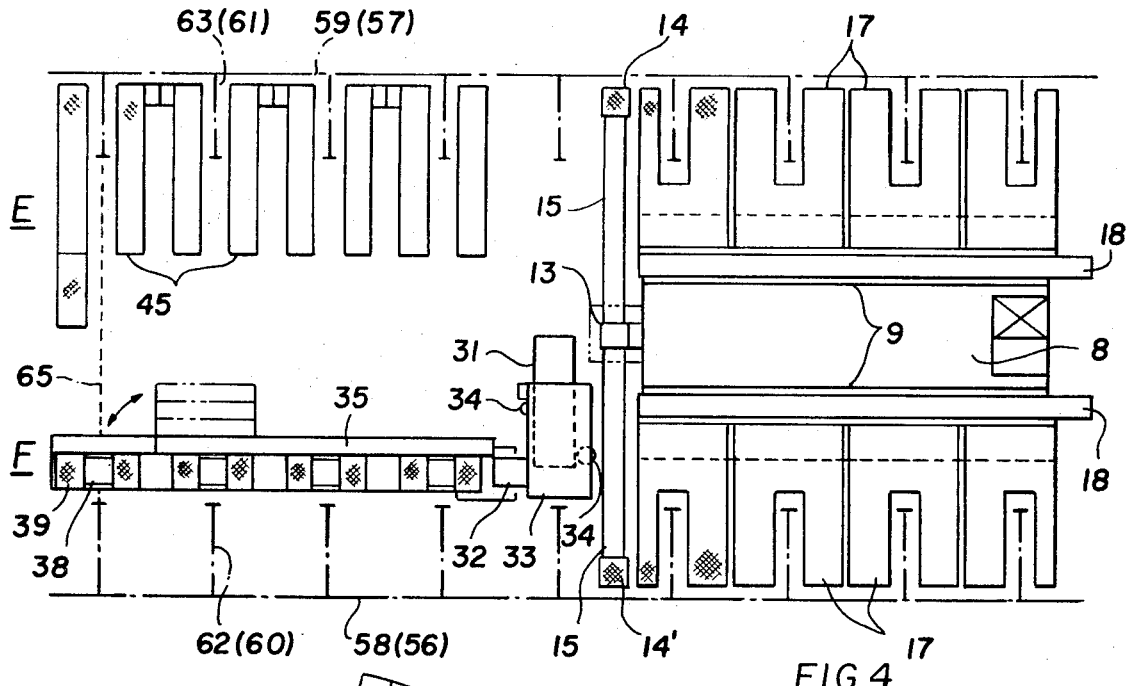
FIG. 4 is a top view thereof, the upper half of FIG. 4 being a view looking in the direction indicated by the arrow E in FIG. 1 while the lower half a view looking in the direction indicated by the arrow F in FIG. 1.

First referring to FIGS. 1, 3 and 4, the tower unit 1 will be described. A trolly housing 8 rides over rails 6 laid upon struts or floors 5 erected on the bottom shell plating 4 and is moved in the longitudinal direction by means of travel gears 7 including electric motors and reduction gears (both of which are not shown). Upon rails 9 laid in the longitudinal direction atop the trolly housing 8 rides a movable upper mast structure 10 comprising a retractable staging 11 which is mounted upon a carriage 12 driven by an electric motor (not shown). The staging 11 is extended or retracted by means of wires or ropes, an electric motor and a reduction gear (all of which are not shown), so that the workmen on the staging 11 may give instruction for alignment of a subassembly to the adjoining subassembly and remove wires and shackles. At the rear center of the trolly housing 8 is vertically erected a box type staging mast 13 which carries a plurality of link arms 15 which are vertically spaced apart from each other and have stagings 14, 14' and 14'' mounted at the free ends for welding butts of side shell plates and vertical joints between longitudinal bulkheads. It should be noted that these link arms 15 are so carried by the mast 13 as to be vertically displaced depending upon a depth of the ship being erected and also transversely displaced by power cylinders 16 as indicated by the solid and dotted lines in FIG. 3.

Figure 5:
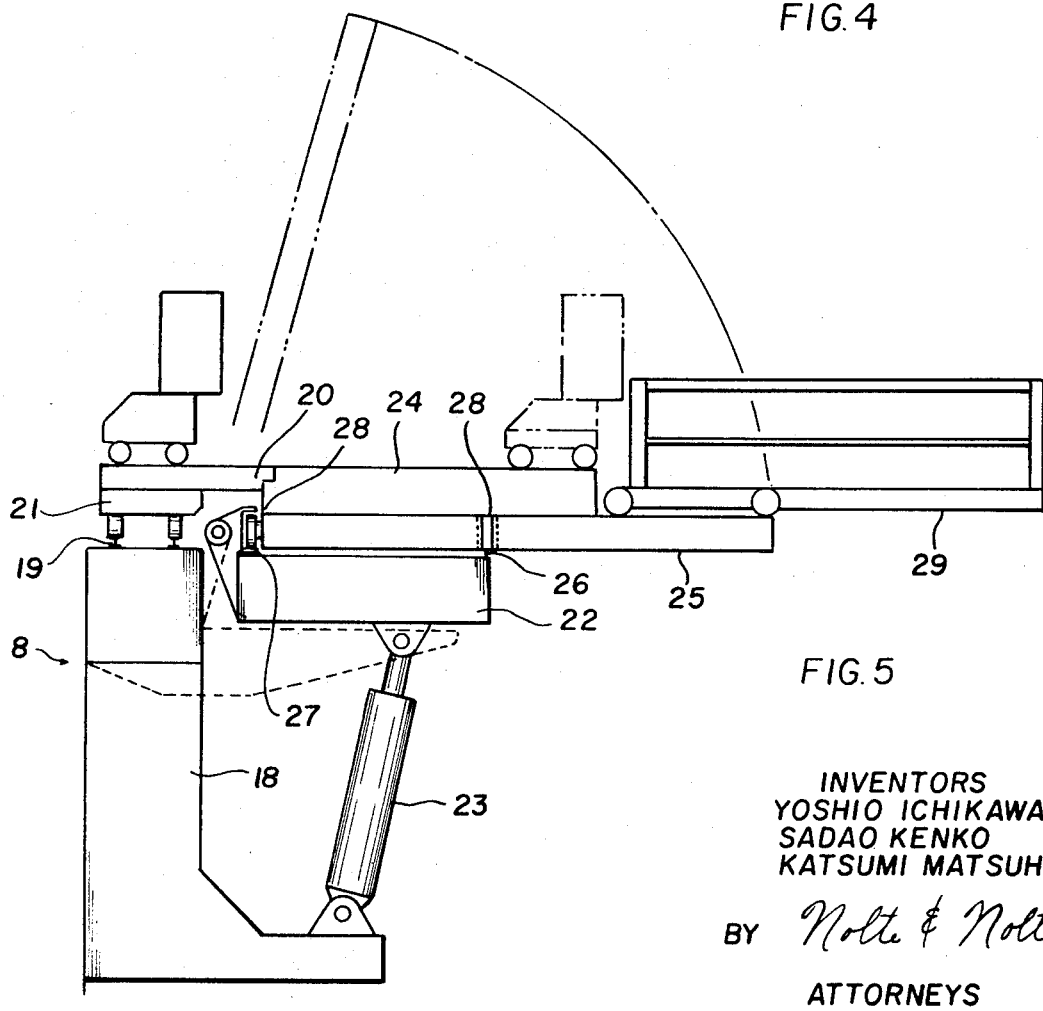
FIG. 5 is a detailed view illustrating the right middle section of FIG. 3.

Next especially referring to FIG. 5, a staging 17 for welding seams of side shell plates and the horizontal joints of longitudinal bulkheads will be described. Upon rails 19 laid upon a box girder 18 rides a carriage 21 carrying a portable rail 20 for guiding a face clipper holding a tack welding jig. A box girder 22 is rotatably mounted upon the box girder 18 in such a way that the girder 22 may be raised by a power cylinder 23 as indicated by the chain lines in FIG. 5. Rollers 28 of an inner staging 25 are guided by rails 26 and 27 laid atop the girder 22 so that the staging may be moved in the longitudinal direction. Upon the inner staging 25 is laid a fixed rail 24 for guiding the face clipper and is mounted an outer staging 29 which is used for welding seams of side shell plates and horizontal joints of longitudinal bulkheads and is movable in the transverse direction. The box girders 18 of the staging 17 of the type described are mounted on the side walls of the trolly housing 8 in such a way that they may be vertically moved depending upon the height of seams and horizontal joints.

The movable mast 10, the mast 13 and the staging 17 are moved in unison with the trolly housing 8, and inside the trolly housing 8 are provided a tool room, a welding room, a power room, a stairway and other facilities so as to improve the working conditions.

Next referring to FIGS. 1, 2 and 4, the mono-pole tower unit 2 will be described. A mono-girder 31 is also movable upon the rails 6 and is driven by travel gears 30 including electric motors and reduction gears (not shown). On both sides of the mono-girders 31 are mounted movable girders 33 (only one of which is visible in FIG. 1 but both of which are visible in FIG. 2) each carrying a monopole 32 in such a way that the mono-pole 32 may be moved transversely of the wing tank along the mono-girder 31 through rollers 34 and 34' fixed to the mono-pole and the movable girder 33.

A plurality of load arms 35 are carried by the monopole 32 in vertically spaced apart relation in such a way that they may be vertically moved by a motor driven winch (not shown). These load arms 35 extend longitudinally and have rails 36 laid upon the upper surfaces. A plurality of stagings 38 each having two stages 39 spaced apart in the longitudinal direction ride over the rails 36 for welding of horizontal joints upper and lower struts 37 and 37'. Upon the undersurface of the load arm 35 is fixed a rail 40 of a hoist 41 for carrying jigs, welding machines and the like. The free end portion of the load arm 35 sufficient enough to support one staging 38 is so arranged as to rotate inwardly through an angle of 180° as indicated by the double-pointed arrow in FIG. 4 so that the transverse bulkheads may be smoothly erected without colliding against the stage 38. In each staging 38 are housed the welding machine and the like.

Next referring to FIGS. 1, 2, 6 and 7, the carriage type unit 3 will be described. Upon rails 42 laid on bottom transverse beams or upper beams or struts 37 rides a carriage 44 which is driven by travel gears 43 including electric motors and reduction gears (not shown). As best shown in FIGS. 6 and 7, two pillars 46 erected upon the carriage 44 mount a retractable staging structure 47 which is also vertically moved along the pillars 46. The staging structure 47 carries one- or two-stage platforms 49 which are so arranged as to sandwich a deck beam 48 and move in the transverse direction. These parts constitute a staging 45, which rides over rails 51 laid on the carriage 44 so as to be driven in the longitudinal direction by an electric motor or the like 50.

A staging 45' similar in construction to the staging 45 is longitudinally movably mounted upon a platform 53 supported by legs 52 fixed to the side of the carriage 44. The height of the staging 45' is selected depending upon the height of the side of the hull. The tack welding jigs and the like are mounted upon the retractable platforms 49 of the stagings 45 and 45' and the fixed platform 54 of the staging structure 47, and the working positions may be suitably selected depending upon the width of the ship by the transverse movement of the retractable platform 49, the longitudinal movement of the stagings 45 and 45' and the vertical movement of the staging structure 47 by the winch or the like. The welding machines and the like may be mounted on the stagings 45 and 45'.

In the figures, reference numeral 55 denotes a bottom block including the floors or struts 5 and the like; 56 and 57, lower side blocks; 58 and 59, upper side blocks; 60, 61, 62 and 63 longitudinal bulkheads divided into two in the direction of the depth; and 64, an upper deck block.

Next the mode of operation will be described. The unit 1 which rides on the rails 6 is followed by the unit 2 and above the unit 2 is disposed the unit 3 which rides on the rails 42. After the hull is partially completed by the unit 1, it is advanced by a distance equal to one half of the length of the unit 1 and the upper and lower subassemblies are welded together by the units 2 and 3 respectively.

The unit 2 may be so arranged as to be advanced in unison with the unit 1 or independently by the travel gears 7 and 30 respectively.

Referring back to FIG. 1, it is assumed that the bottom block 55 has been already erected in the X and Y rings. First the unit 1 rides on the rails 6 in the Y ring and the side blocks 56, 57, 58 and 59 are erected. In this case, the workmen may move onto the upper side blocks 58 and 59 from the mast 10 to determine the width of the upper deck on the wing tank. Thereafter the right and left stagings 17 are suitably extended toward the sides of the hull to tack and weld the horizontal joints between the upper and lower side blocks 56–59 and the side shell plat. Next the stagings 14 and 14' are held in stationary position so as to weld the vertical joints between the upper side block 56 and the lower longitudinal bulkhead subassembly 62; between the lower side block 57 and the lower longitudinal bulkhead 61 on the other side; between the upper side block 58 and the upper longitudinal bulkhead block 52 one on side and the upper side block 59 and the upper longitudinal bulkhead block 62 on the otehr side. In this case the link arms 15 may be suitably displaced along the mast 13 depending upon the depth of the hull.

When the hull except the upper deck is completed by the unit 1 in the manner described above, the unit 1 is moved from the Y ring into the X ring where the hull structure is erected and welded in a similar manner as described above. When the unit 1 is advanced, the mast 10 is retracted so as not to make contact with the hull, and the outer staging 29 in the staging 17 is also retracted inwardly and the inner staging 25 and its box girder 22 are raised by the power cylinder 23 so that they will not contact with the hull and its structural members.

After the unit 1 is moved into the X ring, the unit 2 is advanced into the Y ring where the units 2 and 3 complete the hull. That is, the upper and lower transverse struts or beams 37 and 37' are erected and welded between the longitudinal bulkheads by the unit 2 and then the upper and lower load arms 35 are elevated to desired positions. The vertical joints between the upper struts or beams 37 and the upper longitudinal bulkheads 62 and 63 are tacked and welded by the stagings 38. Similarly the vertical joints between the lower struts 37' and the lower longitudinal bulkhead blocks 60 and 61 are tacked and welded by the stagings 38.

Since the mono-pole 32 is transversely displaced along the monogirder 31, the load arms 35 are suitably displaced depending upon the depth of the hull to weld the joints of the struts 37 and 37'.

When the transverse bulkhead 65 is erected behind the Y ring, the free end portion of the load arm 35 is rotated through 180° so as to prevent it from contacting with the transverse bulkhead 65.

After the works are completed by the unit 2, the load arms 35 are moved downward along the mono-pole 32 by the winch so that the stagings 38 on the load arms 35 will not contact with the struts 37 and 37' when the unit 2 is advanced. The rails 42 are laid upon the struts 37 fixed by the unit 2 and the carriage unit 3 is advanced into the Y ring over the rails 42 as shown in FIG. 1. Next the upper deck block or subassembly 64 is mounted and all of the works associated with the upper deck subassembly are accomplished by the staging 45 which may be elevated and extended or retracted horizontally. When the hull is larger as indicated by the broken lines, the staging 45 is elevated and extended horizontally.

When the hull construction by the unit 1 in the X ring is completed, the unit 1 is advanced into the next ring and the unit 2 is advanced into the X ring with the load arms 35 lowered. The unit 3 is advanced into the X ring after the struts 37 and 37' are welded by the unit 2. The units 1, 2 and 3 are advanced and the hull construction processes by these units are repeated to complete the hull.

It is understood that the present invention will not be limited to the illustrative embodiment described above. It is of course possible to provide a centralized control for the movement of the units 1 and 2, the vertical movement of the load arms 35, the displacement of the monopoles 32, and the like.

In summary, the hull construction facility of the present invention comprises three work units mounting the welding and tack welding machines and other machines and equipments for facilitating the hull construction so that the hull construction works may be concentrated. The units may be advanced as the hull construction work proceeds according to the shipbuilding schedule. In addition the present invention has the following advantages:

I. Since almost all of the construction works are carried out in the limited locations, that is the units, the production and safety controls are much improved;

II. Flat platforms are provided so that the workers may be safeguarded and mentally much relieved as they have no feeling of standing at high working positions;

III. The handling of materials, the erection and welding of subassemblies, the working conditions and the like are extremely improved over the conventional staging;

IV. Since the staging of the present invention are made of metals the safety may be much enhanced as compared with the conventional wooden staging;

V. Large-sized and more efficient jigs and tools may be employed;

VI. All of the jigs, electric wires, gas pipes and the like required for the hull construction are not moved from one working location to another. It is only the worker who move from one working location to another; and VII. The illumination and ventilation system are concentrated in the working locations so that the working conditions may be much improved.

What is Claimed is:

1. A hull construction facility comprising a trolly type work unit having a housing movable upon rails laid upon the bottom plating of a hull, a mast carrying a predetermined number of stagings for erecting said platings and longitudinal bulkheads of the hull; a pole type work unit in which poles each carrying a predetermined number of vertically spaced apart load arms are mounted upon a girder movable upon said rails so that the erection and welding of struts may be accomplished by using the upper surfaces of said load arms; a carriage type work unit which is movable along rails laid upon the uppermost struts erected and welded by said pole type work unit and carries a predetermined number of stagings; said stagings being adapted to support tack welding machines, welding machines and equipments for improving the working conditions possessed in each of said units.

2. A hull construction facility according to claim 1 including a trolly type work unit comprising a housing movable upon rails laid upon the inner bottom plating of a hull being constructed in the longitudinal direction thereof, a movable mast mounted at the front of said housing for providing a stage, a fixed mast which is erected at the rear center of said housing and carries a plurality of vertically spaced apart stagings which extend transversely and are retractable inwardly, and a plurality of stagings transversely mounted upon both sides of said housing, said trolly type work unit being used for erection and welding of side plates, longitudinal bulkheads and the like.

3. A hull construction facility according to claim 1 including a pole type work unit for erection and welding of struts comprising a girder movable upon said rails, two poles mounted upon said girder in transversely spaced apart relation and for transverse movement, a plurality of vertically spaced apart load arms longitudinally carried by each of said poles for vertical movement, and a plurality of movable stagings mounted upon each of said load arms.

4. A hull construction facility according to claim 1 including a carriage work unit which is longitudinally movable along rails laid upon the uppermost struts erected by said pole type work unit and carries a plurality of stagings which extend transversely and are transversely extended or retracted inwardly.

5. A hull construction facility comprising a trolly type work unit comprising a housing movable upon rails laid upon the inner bottom plating of a hull being constructed in the longitudinal direction thereof, a movable mast mounted at the front of said housing for providing a stage, a mast erected at the rear center of said housing and carrying a plurality of vertically spaced apart stagings which extend transversely and are retractable inwardly, and a plurality of stagings transversely mounted upon both sides of said housing, said trolly type work unit being usable for erection and welding of side plates, and longitudinal bulkheads; a pole type work unit for erection and welding of struts comprising a girder movable upon said rails, two poles mounted upon said girder in transversely spaced apart relation and for transverse movement, a plurality of vertically spaced apart load arms longitudinally carried by each of said poles for vertical movement, and a plurality of movable stagings mounted upon each of said load arms; a a carriage unit which is longitudinally movable along rails laid upon the uppermost struts erected by said pole type work unit and carries a plurality of stagings which extend transversely and are transversely extended or retracted inwardly; said stagings being constituted as means for supporting tack welding machines, welding machines and other equipment for improving the working conditions mounted upon each of said work units.

6. A method of constructing a hull from a plurality of prefabricated blocks which comprises laying a bottom block with longitudinally extending rails thereon, supporting a trolly type work unit on said rails for movement therealong longitudinally of the hull, positioning side blocks on said bottom blocks, welding side shells and longitudinal bulkheads from said trolly type work unit, advancing said trolly type work unit longitudinally a distance corresponding to the length of said unit, advancing a pole type work unit into the region vacated by said trolly type work unit, erecting and welding a predetermined number of struts from said pole type unit, laying longitudinal rails on the uppermost of the struts laid by said pole type unit, mounting a carriage type unit on lateral rails and completing an upper deck of said hull from said carriage type unit.

* * * * *